United States Patent
Masu et al.

(10) Patent No.: US 9,360,789 B1
(45) Date of Patent: Jun. 7, 2016

(54) MEMBER FOR ELECTROPHOTOGRAPHY, PROCESS CARTRIDGE AND IMAGE FORMING APPARATUS

(71) Applicant: CANON KABUSHIKI KAISHA, Tokyo (JP)

(72) Inventors: Hiroki Masu, Tokyo (JP); Kazuhiro Yamauchi, Suntou-gun (JP); Satoru Nishioka, Suntou-gun (JP); Kenichi Yamauchi, Mishima (JP); Noriko Suzumura, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/946,768

(22) Filed: Nov. 19, 2015

(30) Foreign Application Priority Data

Nov. 28, 2014 (JP) ................................ 2014-241883

(51) Int. Cl.
| | |
|---|---|
| *G03G 15/02* | (2006.01) |
| *B32B 1/08* | (2006.01) |
| *B32B 15/06* | (2006.01) |

(Continued)

(52) U.S. Cl.
CPC .............. *G03G 15/0233* (2013.01); *B32B 1/08* (2013.01); *B32B 15/06* (2013.01); *B32B 15/18* (2013.01); *B32B 25/14* (2013.01); *B32B 2255/06* (2013.01); *B32B 2255/10* (2013.01); *B32B 2255/205* (2013.01); *B32B 2255/26* (2013.01); *B32B 2264/0207* (2013.01); *B32B 2264/0292* (2013.01); *B32B 2307/20* (2013.01); *B32B 2307/51* (2013.01); *B32B 2307/536* (2013.01);

(Continued)

(58) Field of Classification Search
CPC .. G03G 15/206; G03G 15/0233; B32B 15/06; B32B 25/14
USPC ..................................................... 399/176, 174
See application file for complete search history.

(56) References Cited

U.S. PATENT DOCUMENTS 7,917,064 B2 * 3/2011 Nagamori .......... G03G 15/0233
                                                                  399/176
8,000,633 B2 8/2011 Kato et al.
(Continued)

FOREIGN PATENT DOCUMENTS

JP      2008-83404 A    4/2008
JP      5455336 B2      3/2014

OTHER PUBLICATIONS

Masu, et al., U.S. Appl. No. 14/956,862, filed Dec. 2, 2015.
(Continued)

*Primary Examiner* — Walter L Lindsay, Jr.
*Assistant Examiner* — Jessica L Eley
(74) *Attorney, Agent, or Firm* — Fitzpatrick, Cella, Harper and Scinto

(57) ABSTRACT

It is intended to provide a member for electrophotography that can inhibit the adhesion of dirt to the outer surface. The member for electrophotography has a substrate, an elastic layer on the substrate, and a surface layer on the elastic layer. The surface layer contains a binder resin and first particles, the surface of the surface layer has first convexes derived from the first particles, the first particles resulting in the first convex has an average inter-particle surface distance of 50 nm or less, the first particles have a number-average particle diameter of 200 nm or more and 1000 nm or less, and the surface of the surface layer has a universal hardness of 1.0 N/mm$^2$ or more and 7.0 N/mm$^2$ or less.

9 Claims, 4 Drawing Sheets

(51) Int. Cl.
  *B32B 15/18* (2006.01)
  *B32B 25/14* (2006.01)
(52) U.S. Cl.
  CPC ....... *B32B 2307/538* (2013.01); *B32B 2559/00* (2013.01)

(56) References Cited

U.S. PATENT DOCUMENTS

| | | | |
|---|---|---|---|
| 8,503,911 | B2 | 8/2013 | Suzumura et al. |
| 8,526,857 | B2 | 9/2013 | Tomomizu et al. |
| 9,086,643 | B2 | 7/2015 | Kikuchi et al. |
| 2003/0044199 | A1* | 3/2003 | Funabashi .......... G03G 15/1685 399/176 |
| 2008/0193172 | A1* | 8/2008 | Kusaba .............. G03G 15/0818 399/286 |
| 2012/0076539 | A1* | 3/2012 | Sato ................... G03G 15/0233 399/174 |
| 2013/0004206 | A1 | 1/2013 | Kuroda et al. |
| 2013/0034369 | A1 | 2/2013 | Masu et al. |
| 2013/0064571 | A1 | 3/2013 | Kodama et al. |
| 2013/0295330 | A1* | 11/2013 | Kodama ................. G03G 15/02 428/147 |
| 2014/0004258 | A1 | 1/2014 | Suzumura et al. |
| 2014/0072343 | A1 | 3/2014 | Masu et al. |
| 2014/0080691 | A1 | 3/2014 | Kurachi et al. |
| 2015/0003874 | A1* | 1/2015 | Aoyama ............. G03G 15/0233 399/176 |
| 2015/0331348 | A1 | 11/2015 | Doi et al. |

OTHER PUBLICATIONS

Yamauchi et al., U.S. Appl. No. 14/945,297, filed Nov. 18, 2015.
Niishioka, et al. U.S. Appl. No. 14/943,774, filed Nov. 17, 2015.
Yamauchi et al., U.S. Appl. No. 14/945,314, filed Nov. 18, 2015.

* cited by examiner

MEMBER FOR ELECTROPHOTOGRAPHY, PROCESS CARTRIDGE AND IMAGE FORMING APPARATUS

BACKGROUND OF THE INVENTION

1. Field of the Invention

The present invention relates to a member for electrophotography, a process cartridge and an image forming apparatus.

2. Description of the Related Art

In image forming apparatuses based on an electrophotographic method, a member for electrophotography is employed in various uses, for example, a charging member, a developing member and a transfer member. In the case of employing the member for electrophotography in these uses for a long period, powders such as external additives or toner remaining on an image bearing member adhere as dirty substances to the surface of the member for electrophotography. For example, as for a charging member, when such dirty substances adhere to the surface of the charging member, this area with the dirty substances adhering thereto partially has higher resistance resulting in poor charging. As a result, image density unevenness may occur due to the dirt.

In recent years, higher image quality, higher speed and higher durability have been demanded for image forming apparatuses. In response to these requirements, there is a tendency to reduce the particle diameter of toner and use various types of external additives. As a result, the dirty substances are deposited in larger amounts on the charging member.

A cleaner-less system (toner recycle system) has been proposed from the viewpoint of simplifying image forming apparatuses or eliminating wastes. This method does without a cleaner, which is a cleaning unit on an image bearing member, after a transfer step. The method removes residual toner on the image bearing member after transfer, from the image bearing member by "cleaning simultaneous with development" using a developing apparatus and recovers the toner into the developing apparatus for recycling. The cleaning simultaneous with development is a method which recovers residual toner remaining on the image bearing member after transfer, by use of a fog removing bias (fog removing potential difference Vback which is a potential difference between direct-current voltage applied to the developing apparatus and the surface potential of the image bearing member) during development in the subsequent step or later. In the case of applying a charging member of a contact charging method to the cleaner-less system, the amount of dirty substances, particularly, toner, remaining on the image bearing member is increased as compared with a case having a cleaner. Thus, the adhesion of dirty substances to the charging member is a more significant problem.

As a unit for reducing the adhesion of dirty substances such as external additives or toner, Japanese Patent No. 5455336 and Japanese Patent Application Laid-Open No. 2008-083404 disclose a charging member for which the amount of dirty substances adhering is reduced by the control of surface roughness through a particle contained in a surface layer.

The present invention is directed to providing a member for electrophotography that can more highly inhibit the adhesion of dirty substances to the surface.

The present invention is also directed to providing a process cartridge and an image forming apparatus that can form a high-quality image.

SUMMARY OF THE INVENTION

According to one aspect of the present invention, there is provided a member for electrophotography having a substrate, an elastic layer on the substrate, and a surface layer on the elastic layer, wherein the surface layer contains a binder resin and first particles, the surface of the surface layer has first convexes derived from the first particles, the first particles resulting in the first convex have an average interparticle surface distance of 50 nm or less, the first particles have a number-average particle diameter of 200 nm or more and 1000 nm or less, and the surface of the surface layer has a universal hardness of 1.0 N/mm$^2$ or more and 7.0 N/mm$^2$ or less.

According to an alternative aspect of the present invention, there is provided a process cartridge which is configured to be detachably attachable to the body of an image forming apparatus, in which the process cartridge includes an image bearing member and a charging member disposed in contact with the image bearing member, the charging member being the member for electrophotography.

According to a further alternative aspect of the present invention, there is provided an image forming apparatus having an image bearing member, a charging apparatus which charges the image bearing member, a developing apparatus which develops an electrostatic latent image formed on the image bearing member by use of a developer, and a transfer member which transfers the developer supported by the image bearing member to a transfer medium, in which the charging apparatus has a charging member which is the member for electrophotography.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, the present invention will be described in detail by taking a charging member having a roller shape (hereinafter, also referred to as a "charging roller") as a typical example of a use of the member for electrophotography according to the present invention. However, the present invention is not intended to be limited by this embodiment. The member for electrophotography according to the present invention can also be used as any of other members or as a charging member having any of other shapes.

According to the studies of the present inventors, use of a charging member whose surface roughness is controlled through a particle-derived convex disposed on the surface, as disclosed in Japanese Patent No. 5455336 and Japanese Patent Application Laid-Open No. 2008-083404, has been confirmed to have an effect of reducing the amount of dirty substances adhering by decreasing the friction coefficient of the surface layer. However, the inhibitory effect on the adhesion of dirty substances has been reduced in some cases with increase in the number of output images.

The present inventors have observed the surface of this charging member having a reduced inhibitory effect on the adhesion of dirty substances and consequently confirmed that dirty substances are deposited on a valley part between particle-derived convexes.

Particularly, in the case of using such a charging member in an electrophotographic apparatus based on a cleaner-less system, dirty substances have been particularly prominently deposited on the valley part because residual toner on an image bearing member is contacted with the charging member.

The present invention has been made in light of such conventional configuration and relates to a member for electrophotography capable of further inhibiting the adhesion of dirt to the outer surface.

Figure 3:
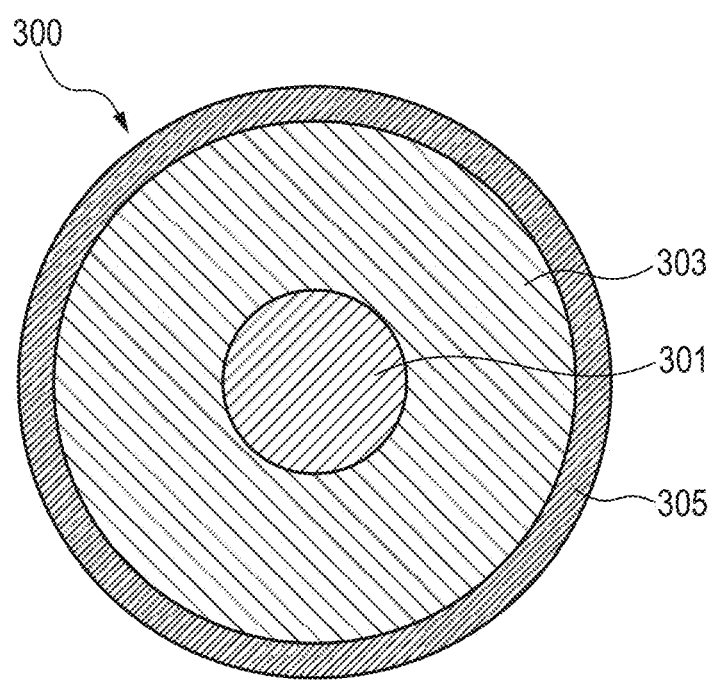
FIG. 3 is a cross-sectional view of the member for electrophotography according to the present invention in an embodiment having a roller shape.

FIG. 3 illustrates a cross section in a direction orthogonal to the axial direction of a charging roller according to one embodiment of the member for electrophotography of the present invention. The charging roller 300 illustrated in FIG. 3 has a substrate 301, an elastic layer 303 disposed on the outer peripheral surface of the substrate 301, and a surface layer 305 disposed on the outer peripheral surface of the elastic layer 303. The surface of the surface layer 305 on an opposite side of its surface facing the elastic layer 303 constitutes the outer surface of the charging roller 300. In the present invention, the "surface" of the surface layer refers to the surface constituting the outer surface of the member for electrophotography, unless otherwise specified.

<Surface Layer>

Figure 4:
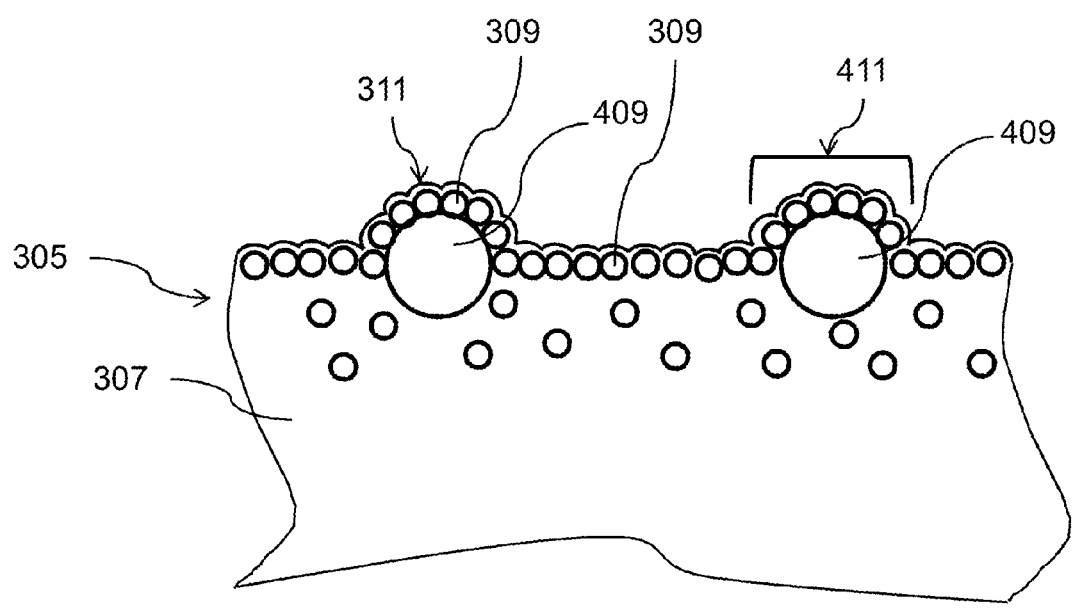
FIG. 4 is a schematic cross-sectional view in proximity to the surface of one example of the member for electrophotography according to the present invention.

FIG. 4 is a schematic cross-sectional view in proximity to the surface of the surface layer 305 in the member 300 for electrophotography according to one embodiment of the present invention. In FIG. 4, the surface layer 305 contains a binder resin 307 and first particles 309. The first particles 309 result in first convexes 311 on the surface of the surface layer 305, i.e., the outer surface of the member 300 for electrophotography.

The first particles 309 viewed from a position opposed to the member 300 for electrophotography have inter-particle surface distances on average (hereinafter, referred to as an average inter-particle surface distance) of 50 nm or less. Specifically, the surface of the member 300 for electrophotography viewed from a position opposed to the member 300 for electrophotography is filled with the first particles 309 disposed close to each other such that the first particles 309 have an average inter-particle surface distance of 50 nm or less.

Figure 2:
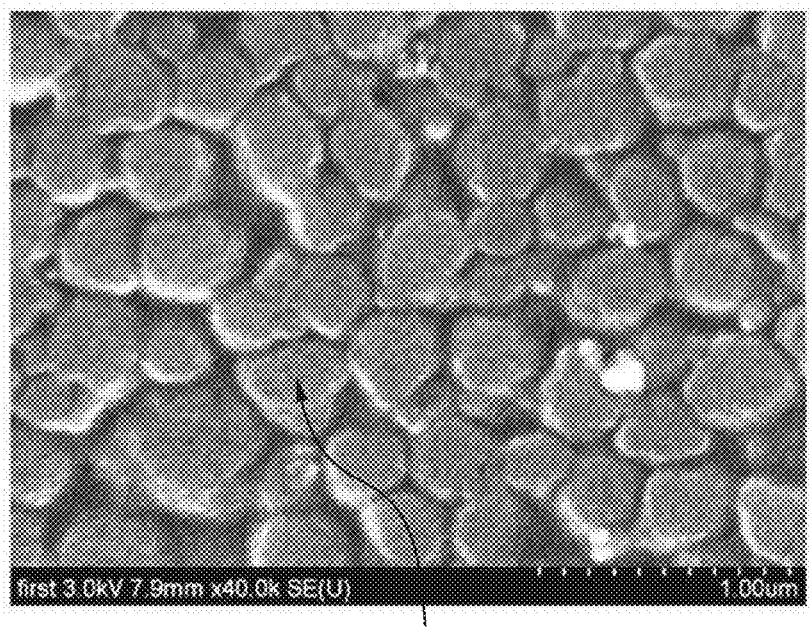
FIG. 2 is a scanning electron microscope (SEM) photograph of one example of a surface layer in the member for electrophotography according to the present invention.

FIG. 2 is a scanning electron microscope (SEM) photograph of the outer surface of the member 300 for electrophotography.

In the present invention, the state where the outer surface of the member for electrophotography viewed from a position opposed to the member for electrophotography is substantially filled with the first particles is indicated by a parameter which is the average inter-particle surface distance of the first particles. The way to determine the average inter-particle surface distance will be described later in detail.

The member for electrophotography whose surface is substantially filled with the first particle resulting in the first convex on the outer surface effectively inhibits the adhesion of dirt to a valley part between first convexes in a conventional member for electrophotography having convexes on the surface. This is probably because the valley part between a plurality of first convexes according to the present invention is smaller in size than the general dirty substances. The average inter-particle surface distance is particularly preferably 45 nm or less, further preferably 40 nm or less. The lower limit of the average inter-particle surface distance is not particularly limited and can be, for example, 10 nm or more.

The main dirty substances adhering to the surface of the charging member subjected to the output of electrophotographic images over a long period are particularly toner-derived substances such as deformed toner or pulverized toner. From this, the present inventors have considered that, particularly, the prevention of deformation and pulverization of toner is effective for reducing the adhesion of dirty substances to the surface of the charging member. For this purpose, the charging member needs to satisfy the following condition 1.

<Condition 1> The surface of the surface layer has a universal hardness of 1.0 N/mm$^2$ or more and 7.0 N/mm$^2$ or less.

The amount of toner-derived dirty substances is increased when the charging member has a high hardness. This is probably because, when the surface of the charging member has a high hardness, toner (residual toner) passing through the nip between the charging member and an image bearing member (electrophotographic photosensitive member) tends to be cracked or chipped. This phenomenon is more prominent for a cleaner-less system. However, the surface layer that satisfies the condition 1 inhibits the cracking or chipping of toner by the charging member.

The surface of the surface layer has a universal hardness of 1.0 N/mm$^2$ or more and 7.0 N/mm$^2$ or less. The universal hardness is preferably 6.0 N/mm$^2$ or less, more preferably 5.0 N/mm$^2$ or less. Since external additives and toner as targeted dirty substances are of the order of submicron to several microns in size, it is required to control the hardness of the topmost surface of the surface layer. The universal hardness can be set to 1.0 N/mm$^2$ or more to thereby inhibit the occurrence of image density unevenness derived from the deformation of the charging member caused by the contact between the charging member and the image bearing member in a resting state for a long period. Also, the universal hardness can be set to 7.0 N/mm$^2$ or less to thereby inhibit the deformation and cracking of toner so that the absolute amount of deformed toner and pulverized toner remaining on the image bearing member can be reduced. Particularly, the universal hardness can be set to 5.0 N/mm$^2$ or less to thereby sufficiently maintain the effect of inhibiting the deformation and cracking of toner even if the number of formed images is increased.

The universal hardness is a physical property value that is determined by indentation of a indenter into a measurement object under a load, and is determined according to (Test load)/(Surface area of the indenter under the test load) (N/mm$^2$). An indenter such as a quadrangular pyramid is pressed into an object to be measured under a predetermined relatively small test load. When the indenter reaches a predetermined indentation depth, the surface area contacted with the indenter is determined from the indentation depth to determine the universal hardness. In the present invention, the universal hardness of the surface of the surface layer is a value measured by a method mentioned later.

<First Particle>

The presence of the first convex inhibits the physical adhesion of dirty substance to the outer surface of the member for electrophotography. As the size of the first particle resulting in the first convex, their number-average particle diameter is 200 nm or more and 1000 nm or less such that the interval between the convexes derived from the first particles is smaller in size than dirty substances when the first particles reside in the surface layer so as to have an average inter-particle surface distance of 50 nm or less.

External additives as dirty substances adhere thereto in an aggregated form rather than each individually. Therefore, the number-average particle diameter can be set to 200 nm or more to thereby form first convex serving as a starting point to inhibit the physical adhesion of the external additives. If the number-average particle diameter is larger than 1000 nm, the physical adhesion of the external additives cannot be inhibited, though the physical adhesion of toner can be inhibited. The number-average particle diameter is preferably 900 nm or less, more preferably 800 nm or less.

The number-average particle diameter is an arithmetic average particle diameter that is obtained by taking the image of an arbitrary region of 3.0 μm square at a magnification of ×40000 using a scanning electron microscope (SEM) and measuring the unidirectional diameters of 30 first particles randomly selected from the obtained image.

One important factor for the surface layer to satisfy the numerical range of the universal hardness related to <condition 1> mentioned above is the first particle.

Specifically, a flexible particle can be used as the first particle for adjusting the universal hardness of the surface layer to 1.0 N/mm$^2$ or more and 7.0 N/mm$^2$ or less.

Specifically, a particle containing a rubber such as a natural rubber, a vulcanized form of the natural rubber or a synthetic rubber, and a particle containing a resin can be suitably used as the first particle.

Among others, a rubber particle can be used from the viewpoint of, for example, securing the uniform contact between the surface layer and the image bearing member and inhibiting the deformation and cracking of toner.

The material for the rubber particle is not particularly limited as long as the material exhibits rubber-like physical properties at an operating temperature, specifically, has a glass transition temperature of 0° C. or less. Examples thereof include silicone rubber, butadiene rubber, styrene-butadiene rubber, nitrile rubber and acrylic rubber. One type of these rubber particles may be used, or two or more types thereof may be used in combination. The rubber particle can have a core-shell structure. A resin having affinity for a solvent in a coating liquid for use in the formation of the surface layer can be used as a material constituting the shell to thereby efficiently move the rubber particle to the surface side of a coating film during the process of evaporating the solvent from the coating film formed from the coating liquid on the elastic layer.

Examples of such a material constituting the shell include methyl polymethacrylate, polystyrene and mixtures thereof, and acrylonitrile. One of these materials may be used, or two or more thereof may be used in combination.

Examples of commercially available rubber-containing a particle that can be suitably used as the first particle include a butadiene rubber-containing particle "Metablen C-223A", a silicone rubber-containing particle "Metablen S-2001", and an acrylic rubber-containing particle "Metablen W-450A" (all are trade names, manufactured by Mitsubishi Rayon Co., Ltd.), Staphyloid (trade name, manufactured by Aica Kogyo Co., Ltd. (formerly Ganz Chemical Co., Ltd.)) and Paraloid (trade name, manufactured by the Dow Chemical Company (formerly Rohm and Haas Company)). The particle diameter distribution of a generally available first particle is generally a normal distribution.

<Binder Resin>

A binder resin known in the art can be used as the binder resin. Examples thereof can include resins and rubbers such as natural rubbers, vulcanized natural rubbers and synthetic rubbers. For example, fluorine resin, polyamide resin, acrylic resin, polyurethane resin, silicone resin, butyral resin, styrene-ethylene/butylene-olefin copolymer and olefin-ethylene/butylene-olefin copolymer can be used as the resins. These binder resins may each be used alone, or two or more thereof may be used as a mixture. Alternatively, a copolymer may be used. Among these resins, polyurethane resin can be used from the viewpoint of controlling the universal hardness of the surface of the surface layer and the volume resistivity of the surface layer. The polyurethane resin can be polycarbonate polyurethane, polyester polyurethane or polyolefin polyurethane from the viewpoint of the dispersibility or surface convex formation of the first particle such as a rubber particle mentioned above.

The binder resin is one important factor for the surface layer to have the universal hardness related to the condition 1.

Specifically, for adjusting the universal hardness of the surface layer to 1.0 N/mm$^2$ or more and 7.0 N/mm$^2$ or less, it is required to use a flexible binder resin.

Specific examples of the polyurethane resin include polyurethane resin obtained by reacting polyester polyol (trade name: P-3010, manufactured by Kuraray Co., Ltd.) with isocyanate-terminated prepolymer (isocyanate group content: 4.3%) obtained through the reaction between polymeric MDI (trade name: Millionate MR200, manufactured by Tosoh Corporation (formerly Nippon Polyurethane Industry Co., Ltd.)) and polyester polyol (trade name: P-3010, manufactured by Kuraray Co., Ltd.), as described in Examples mentioned later.

Alternative examples thereof include polyurethane resin obtained by reacting polyester polyol (trade name: P-3010, manufactured by Kuraray Co., Ltd.) with isocyanate-terminated prepolymer (isocyanate group content: 4.3%) obtained through the reaction between polymeric MDI (trade name: Millionate MR200, manufactured by Tosoh Corporation) and polycarbonate polyol (trade name: T-5652, manufactured by Asahi Kasei Chemicals Corp.).

Further alternative examples thereof include polyurethane resin obtained by reacting castor oil polyol (trade name: URIC-H 1823, manufactured by Itoh Oil Chemicals Co., Ltd.) with isocyanate-terminated prepolymer (isocyanate group content: 4.3%) obtained through the reaction between polymeric MDI (trade name: Millionate MR200, manufactured by Tosoh Corporation) and polyester polyol (trade name: P-2050, manufactured by Kuraray Co., Ltd.).

Further alternative examples thereof include polyurethane resin obtained by reacting polyolefin polyol (trade name: G2000, manufactured by Nippon Soda Co., Ltd.) with isocyanate-terminated prepolymer (isocyanate group content: 4.3%) obtained through the reaction between polymeric MDI (trade name: Millionate MR200, manufactured by Tosoh Corporation) and polyolefin polyol (trade name: G2000, manufactured by Nippon Soda Co., Ltd.).

Further alternative examples thereof include polyurethane resin obtained by reacting polyether polyol (trade name: Exenol 3020, manufactured by Asahi Glass Co., Ltd.) with isocyanate-terminated prepolymer (isocyanate group content: 4.3%) obtained through the reaction between polymeric MDI (trade name: Millionate MR200, manufactured by Tosoh Corporation) and polypropylene glycol polyol (trade name: Exenol 1030, manufactured by Asahi Glass Co., Ltd.).

As the hardness of the surface layer is decreased, the surface generally tends to have higher tackiness. Nonetheless, the member for electrophotography according to the present invention is substantially free from such increase in tackiness attributed to the reduced hardness of the surface layer, because the first particle resulting in the first convex on the outer surface reside with almost no gaps in proximity to the surface of the surface layer as described above.

The surface layer can also satisfy the following condition 2.

<Condition 2> The surface layer has a volume resistivity of $1.0 \times 10^{10}$ Ω·cm or more and $1.0 \times 10^{16}$ Ω·cm or less.

According to the studies of the present inventors, the charging member that satisfies the condition 1 has been confirmed in some cases to cause very small white spots in solid images, particularly, in an environment of high temperature and high humidity, for example, a temperature of 30° C. and a relative humidity of 80%. This is because the direct injection of electric charge without discharge (hereinafter, also referred to as "injection charging") occurs upon contact between the charging member and the image bearing member so that the image bearing member is charged beyond a predetermined amount of charge.

Accordingly, the present inventors have conducted studies on the characteristics of the surface layer for preventing such a phenomenon even in a high-temperature and high-humidity environment. As a result, it has been found that the volume resistivity of the surface layer can be set to $1.0 \times 10^{10}$ Ω·cm or more and $1.0 \times 10^{16}$ Ω·cm or less to thereby inhibit image defects caused by injection charging to an undetectable level.

In this context, the volume resistivity of the surface layer can fall within the aforementioned numerical range even in a high-temperature and high-humidity environment most prone to causing injection charging.

The volume resistivity of the surface layer is particularly preferably $2.0 \times 10^{10}$ Ω·cm or more and $1.0 \times 10^{15}$ Ω·cm or less, further preferably $3.0 \times 10^{10}$ Ω·cm or more and $1.0 \times 10^{14}$ Ω·cm or less. The measurement of the volume resistivity of the surface layer and the evaluation of the amount of injection charge are carried out by methods mentioned later.

The surface layer may contain a second particle having a larger particle diameter than that of the first particle such that the outer surface of the member for electrophotography has a convex derived from the second particle.

Specifically, the surface layer 305 illustrated in FIG. 4 contains a second particle 409 and has a second convex 411 derived from the second particle. As illustrated in FIG. 4, the second convex 411 has the first convex 311 on the surface.

Such configuration can prevent the flexible particle used as the first particle from increasing the contact area between the charging member and the image bearing member at the nip, and inhibit the collapse of the first convex at the nip between the charging member and the image bearing member. As a result, the deformation of the first convex can be inhibited in long-term use.

In addition, this configuration having the second convex having the first convex on its surface can stabilize discharge from the surface of the charging member to the surface of the image bearing member before and after the nip between the charging member and the image bearing member and thus contributes to the higher stabilization of charging performance.

<Second Particle>

The number-average particle diameter of the second particle needs to be larger than that of the first particle. Specifically, the number-average particle diameter can be 3 μm or more and 30 μm or less. This can easily render the second convex higher than the first convex. This can also prevent the second convex from roughening too much the outer surface of the member for electrophotography. The number-average particle diameter of the second particle is particularly preferably 5 μm or more and 20 μm or less, further preferably 7 μm or more and 15 μm or less. The number-average particle diameter of the second particle is measured by using FIB-SEM (Focused Ion-Beam Scanning Electron Microscope). The concrete measuring method is shown below.

A blade of cutter is contacted against a surface layer, and a section is cut out so that a length in an x-axis direction (a longitude direction of a roller) and a y-axis direction (a tangential direction of a circular section in a cross section of the roller perpendicular to the x-axis) is 5 mm respectively. The cut out section is observed from a z-direction (a diametrical direction in a cross section of the roller perpendicular to the x-axis) through the use of the FIB-SEM apparatus under the conditions that acceleration voltage is 10 kV and magnification is 1,000 times. Then, a total of 100 pieces of cross-sectional images from the surface to a depth of 20 μm at 200 nm intervals in the z-direction is taken with an ion beam current of 20 nA using gallium ion beam. With respect to each of second particles observed in a cross-sectional image, the maximum diameter of the particle is defined as a diameter of the particle, and the average value of diameters of 20 particles is defined as the average particle diameter.

In order to set the universal hardness of the surface layer within the range related to the condition 1, high-hardness particle such as a metal particle should not be used as the second particle. Specifically, a particle of a resin such as acrylic resin, polycarbonate resin, styrene resin, urethane resin, fluorine resin or silicone resin can be used as the second particle. One type of these second particles may be used, or two or more types thereof may be used in combination. A urethane resin particle excellent in flexibility is particularly preferred as the second particle.

When the surface layer contains the second particle, the second convex derived from the second particle in the surface layer can have a Martens hardness of 1.0 N/mm² or more and 10.0 N/mm² or less. The Martens hardness is more preferably 8.0 N/mm² or less, further preferably 5.0 N/mm² or less. The Martens hardness can be set to 1.0 N/mm² or more to thereby inhibit the occurrence of image density unevenness derived from the deformation of the charging member caused by the contact between the charging member and the image bearing member in a resting state for a long period. Also, the Martens hardness can be set to 10.0 N/mm² or less to thereby inhibit the deformation of toner by the second convex. The Martens hardness is a value measured by a method mentioned later.

<Electro-Conductive Agent>

The surface layer can contain an electro-conductive agent and thereby have electro-conductivity. However, the volume resistivity of the surface layer can be adjusted within the range related to the condition 2.

Examples of the electro-conductive agent include ion conductive agents and an electro-conductive particle. An electro-conductive particle can be used from the viewpoint of being inexpensive and having few environmental variations in resistance. Examples of the electro-conductive particle can include carbon black, electro-conductive particle of metal oxides such as titanium oxide, tin oxide and zinc oxide, and an electro-conductive particle of metals such as aluminum, iron, copper and silver. These electro-conductive particles can be used alone or in combination of two or more thereof. A composite particle having a silica particle covered with an electro-conductive particle can also be used as the electro-conductive particle. The electro-conductive particle can be carbon black. Carbon black has low specific gravity and high conductivity and can therefore secure sufficient conductivity for the surface layer by addition in a small amount to the binder resin. Also, carbon black can keep the hardness of the surface layer low.

<Other Additives>

The surface layer can contain other additives in addition to the aforementioned components. The surface layer can contain a silicone additive as an additional additive from the viewpoint of improving the surface resistance of the surface layer. The surface layer may be subjected to, for example, modification, introduction of a functional group or a molecular chain, coating or surface treatment with a releasing agent or the like without impairing the effects of the present invention.

The surface layer can be formed by a coating method such as electrostatic spray coating, dipping or ring coating. Alternatively, the surface layer may be formed by adhesion of or covering with a surface layer having a sheet or tube shape formed in advance with a predetermined film thickness. A method of curing and molding materials into a predetermined shape in a mold may also be used. Among others, the surface layer can be formed by the application of a coating liquid containing materials for the surface layer by a coating method, followed by drying.

The physical properties such as dynamic friction coefficient and surface free energy of the surface layer can be adjusted by the surface treatment of the surface layer. Specific examples thereof include a method for irradiating the surface layer with active energy beams. Examples of the active energy beams include ultraviolet rays, infrared rays and electron beams.

<Thickness of Surface Layer>

The thickness of the surface layer is preferably 0.1 μm or more and 100 μm or less, more preferably 1 μm or more and 50 μm or less. The thickness of the surface layer is a value measured by a method mentioned later.

<Method for Producing Surface Layer>

For the production of the surface layer, for example, a coating film is formed on the surface of the elastic layer from a coating liquid containing the binder resin or a starting material for the binder resin and the first particle dissolved or dispersed or dissolved and dispersed in a solvent. Then, the formed coating film is dried so that the surface layer is formed on the elastic layer.

In this context, methyl ethyl ketone can be used as the solvent, and a core-shell structure rubber particle ("Metablen C-223A", trade name, manufactured by Mitsubishi Rayon Co., Ltd.) that has a core made of butadiene rubber and a graft layer covering the core can be used as the first particle to thereby move the rubber particle to the surface side of the coating film during the drying of the solvent from the coating film. As a result, the member for electrophotography can be formed such that the first particles 309 viewed from a position opposed to the member for electrography have their respective inter-particle surface distances on average (hereinafter, referred to as an average inter-particle surface distance) of 50 nm or less. In this context, the average inter-particle surface distance can be controlled by the content of the first particle in the coating liquid.

The drying time of the coating film can be 5 (five) minutes or longer in order to secure the time necessary for the first particle to be moved to the surface side of the coating film.

<Other Components of Member for Electrophotography>

<Substrate>

An electro-conductive substrate can be used as the substrate, and, for example, a metallic (alloy) support (e.g., a cylindrical metal) made of iron, copper, stainless, aluminum, aluminum alloy or nickel can be used.

<Elastic Layer>

An electro-conductive elastic layer can be used as the elastic layer. The electro-conductive elastic layer can contain, for example, a polymer elastomer and an electro-conductive agent. Examples of the polymer elastomer include: synthetic rubbers such as epichlorohydrin rubber, acrylonitrile-butadiene rubber, chloroprene rubber, urethane rubber and silicone rubber; and thermoplastic elastomers such as styrene-butadiene-styrene block copolymer and styrene-ethylene/butylene-styrene block copolymer. One of these polymer elastomers may be used, or two or more thereof may be used in combination. The elastic layer can have ion conductivity. Therefore, epichlorohydrin rubber can be used as the polymer elastomer. The epichlorohydrin rubber can exert favorable conductivity, even when supplemented with the electro-conductive agent in a small amount, because the polymer itself has conductivity in a medium-resistance region. In addition, the epichlorohydrin rubber is suitably used as the polymer elastomer because positional variations in electric resistance can also be decreased.

Examples of the epichlorohydrin rubber include epichlorohydrin homopolymer, epichlorohydrin-ethylene oxide copolymer, epichlorohydrin-allyl glycidyl ether copolymer and epichlorohydrin-ethylene oxide-allyl glycidyl ether ternary copolymer. One of these epichlorohydrin rubbers may be used, or two or more thereof may be used in combination. Among these rubbers, epichlorohydrin-ethylene oxide-allyl glycidyl ether ternary copolymer can be used because of exhibiting stable conductivity in a medium-resistance region. The electro-conductivity or processability of the epichlorohydrin-ethylene oxide-allyl glycidyl ether ternary copolymer can be controlled by arbitrarily adjusting the degree of polymerization or compositional ratio.

The elastic layer may contain, for example, epichlorohydrin rubber alone as the polymer elastomer or may contain epichlorohydrin rubber as a main component and, optionally, an additional rubber. Examples of the additional rubber include EPM (ethylene-propylene rubber), EPDM (ethylene-propylene-diene rubber), NBR (nitrile rubber), chloroprene rubber, natural rubbers, isoprene rubber, butadiene rubber, styrene-butadiene rubber, urethane rubber and silicone rubber. Alternatively, the elastic layer may contain a thermoplastic elastomer such as SBS (styrene-butadiene-styrene block copolymer) or SEBS (styrene-ethylene/butylene-styrene block copolymer). One of these additional rubbers may be used, or two or more thereof may be used in combination. In the case of containing the additional rubber, the content of the additional rubber can be 1 to 50 parts by mass with respect to 100 parts by mass of the elastic layer.

An ion conductive agent or an electron conductive agent can be used as the electro-conductive agent. An ion conductive agent can be used as the electro-conductive agent from the viewpoint of decreasing the electric resistivity unevenness of the elastic layer. The ion conductive agent can be uniformly dispersed in the polymer elastomer to achieve the even electric resistance of the elastic layer. Also in the case of using the ion conductive agent for applying only direct-current voltage to the member for electrophotography used as the charging member, the image bearing member can be uniformly charged.

The ion conductive agent is not particularly limited as long as the ion conductive agent exhibits ion conductivity. Examples of the ion conductive agent include: inorganic ionic substances such as lithium perchlorate, sodium perchlorate and calcium perchlorate; quaternary ammonium salts such as lauryl trimethylammonium chloride, stearyl trimethylammonium chloride and tetrabutylammonium perchlorate; and inorganic salts of organic acids such as lithium trifluoromethanesulfonate and potassium perfluorobutanesulfonate. These ion conductive agents can be used alone or in combination of two or more types thereof. Among these ion conductive agents, perchloric acid quaternary ammonium salt can be used because of having stable resistance against environmental change.

The electron conductive agent is not particularly limited as long as the electron conductive agent is an electro-conductive particle that exhibits electron conductivity. Examples thereof can include: carbon black such as furnace black, thermal black, acetylene black and ketjen black; an electro-conductive particle of metal oxides such as titanium oxide, tin oxide and zinc oxide; and an electro-conductive particle of metals such as aluminum, iron, copper and silver. These electron conductive agents can be used alone or in combination of two or more types thereof.

The content of the electro-conductive agent can be an amount in which the volume resistivity of the elastic layer is $1 \times 10^3$ to $1 \times 10^9$ Ω·cm in a low-temperature and low-humidity environment (15° C. and 10% RH), a normal-temperature and normal-humidity environment (23° C. and 50% RH) and a high-temperature and high-humidity environment (30° C. and 80% RH). This is because the resulting member for electrophotography exerts favorable charging performance. In addition, the elastic layer can optionally contain ingredients such as a plasticizer, a filler, a vulcanizing agent, a vulcanization promoter, an antioxidant, an antiscorching agent, a dispersant and a releasing agent. The volume resistivity of the elastic layer is a value measured in the same way as a method for measuring the volume resistivity of the surface layer mentioned later using a volume resistivity measurement sample obtained by molding materials for use in the elastic layer into a sheet having a thickness of 1 mm and depositing a metal onto both surfaces of the sheet to form an electrode and a guard electrode.

The hardness of the elastic layer is preferably 50° or more and 70° or less, more preferably 50° or more and 60° or less, in terms of microhardness (MD-1 type). The microhardness (MD-1 type) can be set to 50° or more to thereby inhibit the occurrence of image density unevenness derived from the deformation of the charging member caused by the contact between the charging member and the image bearing member in a resting state for a long period. The microhardness (MD-1 type) can be set to 70° or less to thereby sufficiently secure the width of the nip between the charging member and the image bearing member and prevent toner from being deformed or cracked due to an increased contact pressure.

The "microhardness (MD-1 type)" is a hardness measured using ASKER microrubber hardness tester model MD-1 (trade name, manufactured by Kobunshi Keiki Co., Ltd.). Specifically, the microhardness (MD-1 type) is a value measured for a sample left for 12 hours or longer in a normal-temperature and normal-humidity (23° C. ad 50% RH) environment using the hardness tester at the 10 N peak hold mode.

The elastic layer can be prepared by mixing starting materials for the elastic layer in a hermetical mixer and molding the mixture by a method, for example, extrusion molding, injection molding or compression molding. Alternatively, the elastic layer may be molded directly on the substrate, or the substrate may be covered with the elastic layer molded in advance into a tube shape. The surface of the elastic layer thus prepared may be polished to arrange its shape.

<Process Cartridge and Image Forming Apparatus>

The process cartridge has an image bearing member and a charging member disposed in contact with the image bearing member. The process cartridge is also configured to be detachably attachable to the body of an image forming apparatus. The charging member is the member for electrophotography according to the present invention.

The image forming apparatus has an image bearing member, a charging apparatus which charges the image bearing member, a developing apparatus which develops an electrostatic latent image formed on the image bearing member by use of a developer, and a transfer member which transfers the developer supported by the image bearing member to a transfer medium. The charging apparatus has a charging member which is the member for electrophotography according to the present invention. The charging apparatus can also have a voltage application device which applies voltage to the charging member. The charging apparatus can charge the surface of the image bearing member upon contact with the image bearing member, while recovering the developer remaining on the image bearing member after a transfer step of transferring the developer supported by the image bearing member to the transfer medium. One example of the image forming apparatus according to the present invention is illustrated in FIG. 1.

Figure 1:
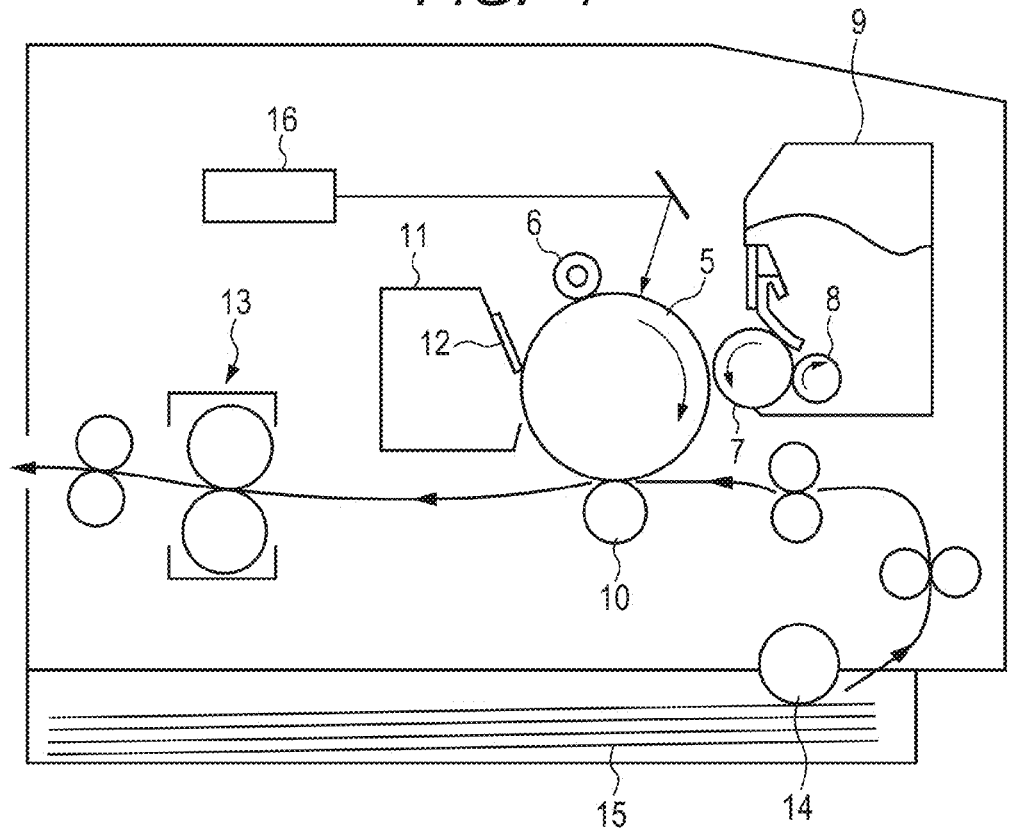
FIG. 1 is a cross-sectional view illustrating one example of the image forming apparatus according to the present invention.

The image forming apparatus illustrated in FIG. 1 includes an image bearing member 5 which rotates clockwise in FIG. 1, a charging member 6 which is the member for electrophotography according to the present invention, a transfer member 10, a cleaner container 11, a cleaning blade 12, a fixing device 13, a pickup roller 14, and the like. The image bearing member 5 is charged by the charging member 6 through the application of voltage thereto by a voltage application device (not shown). Then, the image bearing member 5 is irradiated with laser beams by a laser generation device 16 for light exposure to form an electrostatic latent image corresponding to the desired image on the charged surface of the image bearing member 5. The electrostatic latent image on the image bearing member is developed via a toner bearing member 7 and a toner supplying member 8 by toner, which is the developer in a developing apparatus 9, to obtain a toner image. The toner image is transferred onto a transfer medium 15 such as paper by the transfer member 10 which is in contact with the image bearing member 5 via the transfer medium 15 and to which voltage having reversed polarity of the polarity of the toner has been applied. The transfer medium 15 carrying the toner image is delivered to the fixing device 13 so that the toner image is fixed on the transfer medium 15. Toner partially remaining on the image bearing member 5 is scraped off by the cleaning blade 12 and housed in the cleaner container 11.

The charging apparatus according to the present invention can be a contact charging apparatus which applies a predetermined charging bias to the charging member 6 that has formed a contact part by contact with the image bearing member 5, to charge the surface of the image bearing member 5 into a predetermined polarity and potential. The contact charging using the apparatus achieves stable and uniform charging and can further reduce the generation of ozone. The charging member 6 that rotates in the opposite direction as in the image bearing member 5 can be used for keeping the contact with the image bearing member 5 uniform and carrying out even charging. That is, in the case that the electrophotographic photosensitive member 5 is rotated in the clockwise direction, the charging member is preferably rotated in the counterclockwise direction. Also, the charging member 6 can be moved with a difference in speed from the image bearing member 5. The charging member 6 can be configured to be moved with a difference in speed kept in the forward direction with respect to the moving direction of the image bearing member 5. This configuration adopted in the cleaner-less image forming apparatus can prevent residual toner on the image bearing member 5 from being moved onto the surface of the charging member 6.

According to one aspect, the present invention can provide a member for electrophotography. The member for electrophotography can be used as, for example, a charging member, a developing member or a transfer member. The present invention can also provide a process cartridge and an image forming apparatus that can form a high-quality image.

EXAMPLES

Hereinafter, the present invention will be described in more detail with reference to Examples. However, the present invention is not intended to be limited by these Examples by any means. The unit "part" means "part by mass".

Example 1

1. Preparation of Unvulcanized Rubber Composition

Each material of type and amount shown in Table 1 was mixed using a pressurization-type kneader to obtain kneaded rubber composition A. Further, 183.0 parts by mass of the kneaded rubber composition A were mixed with each material of type and amount shown in Table 2 below using an open roll to obtain an unvulcanized rubber composition.

TABLE 1

| Material | Parts by mass |
| --- | --- |
| Epichlorohydrin-ethylene oxide-allyl glycidyl ether ternary copolymer (GECO) (trade name: Epichlomer CG-102, manufactured by Osaka Soda Co., Ltd. (formally Daiso Co., Ltd.)) | 100.0 |
| Zinc oxide (Zinc Oxide Two, manufactured by Seido Chemical Industry Co., Ltd.) | 5.0 |
| Calcium carbonate (trade name: Silver W, manufactured by Shiraishi Calcium Kaisha, Ltd.) | 60.0 |
| Carbon black (trade name: Thermax Flow Form N990, manufactured by Cancarb Limited) | 5.0 |
| Stearic acid | 1.0 |
| Aliphatic polyester plasticizer (trade name: Polycizer P202, manufactured by DIC Corporation (formerly, Dainippon Ink and Chemicals, Inc.)) | 10.0 |
| Ion conductive agent: perchloric acid quaternary ammonium salt (trade name: Adekacizer LV70, manufactured by ADEKA Corporation) | 2.0 |

TABLE 2

| Material | Parts by mass |
| --- | --- |
| Sulfur (trade name: Sulfax PMC, manufactured by Tsurumi Chemical Industry Co., Ltd.) | 0.8 |
| Dibenzothiazolyl disulfide (trade name: Nocceler DM, manufactured by Ouchi Shinko Chemical Industrial Co., Ltd.) | 1.0 |
| Tetramethylthiuram monosulfide (trade name: Nocceler TS, manufactured by Ouchi Shinko Chemical Industrial Co., Ltd.) | 0.5 |

2. Preparation of Elastic Member

A steel substrate (having nickel-plated surface) in a cylindrical shape of 6 mm in diameter and 252.5 mm in length was coated with a thermosetting adhesive (Metalock N-33, manufactured by ToyoKagaku Kenkyusho Co., Ltd.). The resulting product was dried at 80° C. for 30 minutes and then further dried at 120° C. for 1 hour.

Next, the unvulcanized rubber composition was coaxially extruded in a cylindrical form of 8.75 to 8.90 mm in outer diameter onto the substrate using a crosshead extruder to obtain an unvulcanized rubber member. Subsequently, the unvulcanized rubber member was charged into a hot-air vulcanization furnace of 160° C. and heated for 60 minutes for the vulcanization of the unvulcanized rubber composition layer to obtain an unpolished elastic member. Then, both ends of the rubber were cut off to adjust the length of the elastic layer to 232 mm. Then, the surface of the elastic layer was polished with a grindstone into a roller shape having an outer diameter of 8.5 mm to obtain an elastic member having the elastic layer on the substrate. The crown quantity (difference in outer diameter between the central portion and a position 90 mm distant from the central portion) of the elastic member was 110 µm.

3. Preparation of Coating Liquid 1

Coating liquid 1 for use in the formation of a surface layer was prepared by the following approach: in a nitrogen atmosphere, 100 parts by mass of polyester polyol (trade name: P3010, manufactured by Kuraray Co., Ltd.) were gradually added dropwise to 27 parts by mass of polymeric MDI (polymethylene polyphenyl polyisocyanate) (trade name: Millionate MR200, manufactured by Tosoh Corporation) in a reaction vessel, while the internal temperature of the reaction vessel was kept at 65° C. After the completion of the dropwise addition, the mixture was reacted at 65° C. for 2 hours. The obtained reaction mixture was cooled to room temperature to obtain isocyanate-terminated prepolymer 1 having an isocyanate group content of 4.3% by mass.

54.9 parts by mass of the isocyanate-terminated prepolymer 1, 41.52 parts by mass of polyester polyol (trade name: P2010, manufactured by Kuraray Co., Ltd.) and 23 parts by mass of carbon black (MA230, manufactured by Mitsubishi Chemical Corp.) were added to methyl ethyl ketone (MEK). The solid content of this mixture was adjusted to 27% by mass to prepare mixed solution 1. 270 parts by mass of the mixed solution 1, 15 parts by mass of rubber particle (trade name: Metablen C-223A, manufactured by Mitsubishi Rayon Co., Ltd.) having a number-average particle diameter of 200 nm as the first particle, and 200 parts by mass of glass beads having an average particle diameter of 0.8 mm were placed in a 450 mL glass vial. This mixture was dispersed for 12 hours using a paint shaker dispersing machine. Then, 30 parts by mass of urethane resin particle (trade name: DAIMICBEAZ UCN-5070D, manufactured by Dainichi Seika Color & Chemical Mfg. Co., Ltd.) having a number-average particle diameter of 7.0 µm were added thereto as the second particle. Then, the mixture was further dispersed for 15 minutes, and the glass beads were removed to obtain coating liquid 1.

4. Preparation of Member 1 for Electrophotography

The elastic member was dipped once in the coating liquid 1 and then dried in air at 23° C. for 30 minutes. Subsequently, the resulting product was dried for 1 hour in a hot-air circulation dryer set to 80° C., and further dried for 1 hour in a hot-air circulation dryer set to 160° C. to form a surface layer on the outer peripheral surface of the elastic member. The dipping time for the dip coating was 9 seconds. The pulling rate for the dip coating was adjusted to 20 mm/sec as an initial speed and 2 mm/sec as a final speed and changed linearly with respect to the time from 20 mm/sec to 2 mm/sec. In this way, the member 1 for electrophotography having the surface layer formed on the elastic layer was obtained.

5. Physical Property Evaluation

Next, the obtained member 1 for electrophotography was evaluated for the following physical properties.

<Evaluation 5-1. Thickness of Surface Layer>

A total of 9 cross sections (3 areas in the axial direction×3 areas in the circumferential directions) of the surface layer were cut out with a sharp knife. The respective thicknesses of these areas were measured by observation under an optical microscope or an electron microscope, and an average thereof was adopted. The measurement results are shown in Tables 9-1 to 9-6.

<Evaluation 5-2. Universal Hardness of Surface of surface Layer>

The universal hardness at a position 1 μm deep from the surface of the surface layer was measured using a universal hardness tester. The measurement results are shown in Tables 9-1 to 9-6.

In this measurement, a microhardness tester (trade name: FISCHERSCOPE HM-2000, manufactured by Helmut Fischer GmbH) was used. The specific measurement conditions are given below.
Measurement indenter: Vickers indenter, interfacial angle 136°, Young's modulus of 1140 GPa, Poisson's ratio of 0.07;
Measurement environment: temperature: 23° C., relative humidity: 50%
Maximum test load: 1.0 mN
Load conditions: A load was applied in proportion to time at a rate where the load reached the maximum test load in 30 seconds.

In this evaluation, the universal hardness is calculated according to the following expression (1) using a load F at the point in time when the indenter was pressed into the depth of 1 μm from the surface of the surface layer, and a contact area A between the indenter and the surface layer, at the time.

$$\text{Universal hardness (N/mm}^2\text{)}=F/A \quad \text{Expression (1)}$$

<Evaluation 5-3. Martens Hardness of Second Convex of Surface Layer>

The Martens hardness of the second convex derived from the second particle (urethane resin particle) in the surface layer was measured using a microhardness tester (trade name: PICODENTOR HM-500, manufactured by Helmut Fischer GmbH). The measurement results are shown in Tables 9-1 to 9-6.

The measurement conditions are given below. Measurement indenter: Vickers indenter, interfacial angle 136°, Young's modulus of 1140 GPa, Poisson's ratio of 0.07;
Indenter material: diamond
Measurement environment: temperature: 23° C., relative humidity: 50%
Loading rate and unloading rate: 1 mN/50 seconds In this evaluation, the tip of the indenter was contacted with the second convex on the surface of the member for electrophotography, and a load was applied thereto at the rate described in the aforementioned conditions. When the load reached 0.04 mN, the load was kept for the time described in the aforementioned conditions. Then, an indentation depth h was determined, and the Martens hardness was calculated according to the following expression (2).

$$\text{Martens hardness HM (N/mm}^2\text{)}=F \text{ (N)/Surface area} \\ \text{(mm}^2\text{) of the indenter under the test load} \quad \text{Expression (2)}$$

<Evaluation 5-4. Arithmetic Average Roughness (Ra) of Surface>

The arithmetic average roughness (Ra) of the surface was measured based on JIS B0601:1982 using a surface roughness tester (trade name: Surfcorder SE3400, manufactured by Kosaka Laboratory Ltd.). In this measurement, a diamond contact probe having a tip radius of μm was used. The measurement speed was 0.5 mm/s; the cutoff frequency λc was 0.8 mm; the reference length was 0.8 mm; and the evaluation length was 8.0 mm. The respective roughness curves were measured for a total of 9 points (3 points in the axial direction×3 points in the circumferential direction) in the surface of the member 1 for electrophotography to calculate Ra. Average Ra of these 9 points was determined. This average value was used as the Ra value of the member 1 for electrophotography. The measurement results are shown in Tables 9-1 to 9-6.

<Evaluation 5-5. Volume Resistivity of Surface Layer>

The volume resistivity of the surface layer was measured using an atomic force microscope (AFM) (trade name: Q-scope 250, manufactured by Quesant Instrument Corp.) at the electro-conductive mode. Specifically, the surface layer was cut into a sheet of 2 mm in width and 2 mm in length using a manipulator, and platinum was deposited on one surface thereof. Next, a direct-current power supply (trade name: 6614C, manufactured by Agilent Technologies, Inc.) was connected to the platinum-deposited surface and allowed to apply 10 V thereto. A free end of a cantilever was contacted with the other surface to obtain a current image through the body of AFM. 100 areas in the surface layer were randomly measured, and the volume resistivity was calculated from the average current value of top 10 areas of low current values, and the thickness. The measurement conditions are given below. The measurement results are shown in Tables 9-1 to 9-6.

[Measurement Conditions]
Measurement mode: contact
Cantilever: CSC17
Measurement range: 10 nm×10 nm
Scan rate: 4 Hz
Applied voltage: 10 V <Evaluation 5-6. Average Inter-Particle Surface Distance of First Particles Resulting in a First Convex>

The average inter-particle surface distance of the first particles (rubber particles) resulting in the first convex on the surface of the surface layer of the member for electrophotography was measured by the following method.

First, a sample (size: 10 mm long, 10 mm wide and 3 mm thick) containing the surface of the surface layer was cut out of the member for electrophotography. Platinum was deposited at a thickness of 10 nm onto the surface (which corresponded to the surface of the surface layer) of the sample. Subsequently, the platinum-deposited surface of the sample was exposed to electron beams using a scanning electron microscope (trade name: S-4800, manufactured by Hitachi High-Technologies Corp.). A region of 3.0 μm long×3.0 μm wide was observed at a magnification of ×40000 and photographed.

The obtained image was analyzed using image analysis software (trade name: Image-Pro Plus, manufactured by Roper Technologies, Inc. (formerly PlanEtron)). Specifically, the number of pixels per unit length was calibrated from the micron bar during the photographing. 20 first particles in the photograph were randomly selected, and the inter-particle surface distances of each particle from its neighboring particles were measured. Then, the largest inter-particle surface distance among the inter-particle surface distances of each particle from its neighboring particles was defined as the inter-particle surface distance of this particle. An arithmetic average thereof was used as the average inter-particle surface distance.

If 20 first particles cannot be observed in the region of 3.0 μm long×3.0 μm wide, the inter-particle surface distances are measured by sequentially moving the region until the 20 first particles to be measured and their neighboring first particles can be recognized.

6. Image Evaluation

Next, the obtained member 1 for electrophotography was used in the following image evaluation.

<Evaluation 6-1. Dirt Evaluation>

A laser beam printer (trade name: HP LaserJet P1505 Printer, manufactured by HP Inc.) was prepared as an image forming apparatus. The laser beam printer is capable of outputting A4 size paper in the longitudinal direction. The laser printer has a printing speed of 23 sheets/min. and an image resolution of 600 dpi. The member 1 for electrophotography was incorporated as a charging member into a process cartridge (trade name: "HP 36A (CB436A)", manufactured by HP Inc.) for the laser beam printer. The resulting process cartridge was loaded in the laser beam printer.

Figure 5:
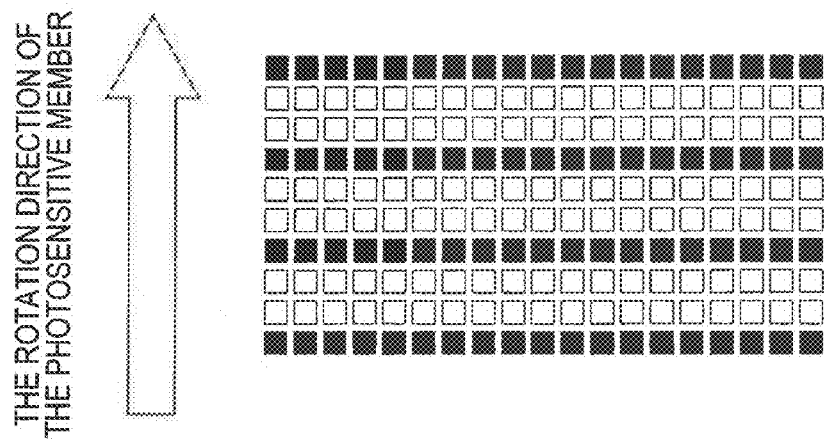
FIG. 5 is a diagram for illustrating a halftone image used for evaluation.

The laser beam printer was used to form 2000 images with a 4-point letter of alphabet "E" printed at a coverage rate of 1% on A4 size paper in a low-temperature and low-humidity (temperature: 15° C., relative humidity: 10%) environment. This image formation was carried out at the so-called intermittent mode involving stopping the rotation of the image bearing member over 7 seconds after each output of one sheet. The image formation at the intermittent mode increases the number of rubs between the charging member and the image bearing member as compared with continuous image formation, and thus serves as more stringent evaluation conditions for the charging member. After the completion of the output of 2000 images in this way, halftone images in which lines having a width of 1 dot were drawn in a direction perpendicular to the rotational direction of the image bearing member at 2 dots interval, as shown in FIG. 5, were output. The obtained images were evaluated according to criteria given below. The evaluation results are shown in Tables 9-1 to 9-6.

A: Charging unevenness caused by the adhesion of toner or external additives to the surface of the charging member was not found on the output image.
B: Charging unevenness caused by the adhesion of toner or external additives to unevenly coated or streak portions on the surface of the charging member was hardly found on the output image.
C: Charging unevenness caused by the adhesion of toner or external additives to unevenly coated or streak portions on the surface of the charging member was found on the output image.
D: Charging unevenness caused by the adhesion of toner or external additives to unevenly coated or streak portions on the surface of the charging member was found on the output image, and the degree of this charging unevenness was large, specifically, the charging unevenness was found as white longitudinal streaks.

<Evaluation 6-2. Discharge Characterization>

Images were output in the same way as in the evaluation 6-1 and evaluated according to criteria given below. The evaluation results are shown in Tables 9-1 to 9-6.

A: White spots were not visually observed on the output image.
B: White spots were slightly observed on the output image.
C: White spots were observed throughout the output image.

<Evaluation 6-3. Evaluation of the Amount of Injection Charge>

The member 1 for electrophotography was incorporated as a charging member into a process cartridge (trade name: "HP 36A (CB436A)", manufactured by HP Inc.). A surface potential tester probe (trade name: MODEL 555P-1, manufactured by TREK Japan K.K.) was placed at a position that was a position rotated by 90 degrees from the position of the charging member in the circumferential direction to the developing apparatus side of the image bearing member and was 2 mm distant from the image bearing member. The process cartridge was inserted to a laser beam printer (trade name: HP LaserJet P1505 Printer, manufactured by HP Inc.). In a high-temperature and high-humidity (temperature: 30° C., relative humidity: 80%) environment, the surface potential (amount of injection charge) of the position 90 mm distant from the central portion of the image bearing member was measured upon application of DC −500 V voltage to the charging member at half the rotational speed of the image bearing member. The average waveform in the first round of the measured image bearing member was defined as the amount of injection charge. The evaluation results are shown in Tables 9-1 to 9-6.

The amount of injection charge is a value measured under the condition of DC −500 V without the discharge of the charging member. The amount of injection charge evaluated here is an amount of injection charge added to the image bearing member due to a factor other than the discharge. Therefore, a larger value of the amount of injection charge means that the surface potential of the image bearing member is more difficult to control in actual image output. This phenomenon is particularly prominent in a high-temperature and high-humidity environment. As a guide, the amount of injection charge in which image output with a stable density can be maintained is 50 [−V] or less.

<Evaluation 6-4. Dirt Evaluation (Cleaner-Less)>

Next, dirt evaluation was conducted using a cleaner-less mechanism. A gear was installed on the member 1 for electrophotography such that the member for electrophotography rotates at a circumferential speed with a difference of 5% in the forward direction relative to the rotation of the image bearing member. The gear-attached member 1 for electrophotography was incorporated as a charging member into a process cartridge (trade name: "HP 36A (CB436A)", manufactured by HP Inc.) from which a cleaning blade was removed. The process cartridge and a laser beam printer (trade name: HP LaserJet P1505 Printer, manufactured by HP Inc.) were used to output 100 images, in each of the images, lines having a width of 2 dots were drawn in a direction perpendicular to the rotational direction of the image bearing member at 100 dots interval on A4 size paper in a low-temperature and low-humidity (temperature: 15° C., relative humidity: 10%) environment. Then, the member 1 for electrophotography was removed from the process cartridge. The "dirt evaluation (cleaner-less) 5%" was conducted by the following tape coloring evaluation.

The tape coloring evaluation was conducted as follows: adhesive polyester tape (trade name: No. 31B, manufactured by Nitto Denko Corp.) was attached to the surface of the member 1 for electrophotography. Then, the adhesive tape was peeled off together with toner adhering to the surface of the member 1 for electrophotography and attached to white paper. This operation was carried out as to the whole image printing region on the surface of the member 1 for electrophotography. Then, the reflection density of the adhesive tape was measured using a photovoltaic reflection densitometer (trade name: TC-6DS/A, manufactured by Tokyo Denshoku Co., Ltd.) to determine the maximum value (A) thereof. Next, the reflection density of the fresh polyester adhesive tape attached to white paper was measured in the same way as above to determine the minimum value (B) thereof. The difference between the minimum value (B) and the maximum value (A) was used as a value of the coloring density. A smaller value of the coloring density means favorable results about the member for electrophotography having a smaller amount of dirt. Therefore, the value was used as an index for the degree of dirt on the member for electrophotography. The evaluation results are shown in Tables 9-1 to 9-6.

Next, a gear was installed on the member for electrophotography such that the member 1 for electrophotography rotates at a circumferential speed with a difference of 10% in the forward direction relative to the rotation of the image bearing member. Images were output in the same way as in the "dirt evaluation (cleaner-less) 5%". The "dirt evaluation (cleaner-less) 10%" of the member 1 for electrophotography was conducted by the tape coloring evaluation. The evaluation results are shown in Tables 9-1 to 9-6.

<Evaluation 6-5. Evaluation of Amount of Injection Charge (Cleaner-Less)>

The member 1 for electrophotography provided with a 5% difference in peripheral speed in the forward direction with respect to the rotation of the image bearing member in the same way as in the evaluation 6-4 was incorporated as a charging member into a process cartridge (trade name: "HP 36A (CB436A)", manufactured by HP Inc.) from which a cleaning blade was removed. A surface potential tester probe (trade name: MODEL 555P-1, manufactured by TREK Japan K.K.) was placed at a position that was a position rotated by 90 degrees from the position of the charging member in the circumferential direction to the developing apparatus side of the image bearing member and was 2 mm distant from the image bearing member. The process cartridge was inserted to a laser beam printer (trade name: HP LaserJet P1505 Printer, manufactured by HP Inc.). In the same way as in the evaluation 6-3, the surface potential (amount of injection charge) of the position 90 mm distant from the central portion of the image bearing member was measured upon application of DC −500 V voltage to the charging member. The average waveform in the first round of the measured image bearing member was defined as the "amount of injection charge (cleaner-less) 5%". The evaluation results are shown in Tables 9-1 to 9-6.

Next, the member 1 for electrophotography provided with a 10% difference in peripheral speed in the forward direction with respect to the rotation of the image bearing member was incorporated as a charging member into the process cartridge from which a cleaning blade was removed. The "amount of injection charge (cleaner-less) 10%" was measured in the same way as in the measurement of the "amount of injection charge (cleaner-less) 5%". The evaluation results are shown in Tables 9-1 to 9-6.

Examples 2 to 37

Preparation of Coating Liquids 2 to 33

Coating liquids 2 to 33 were prepared in the same way as in the coating liquid 1 except that the composition was changed as shown in Tables 3-1 to 3-4. The types of the following components (A) to (E) described in Tables 3-1 to 3-4 are shown in Table 4.
(A) Polyol (hydroxy-terminated prepolymer),
(B) Isocyanate (isocyanate-terminated prepolymer),
(C) Second particle,
(D) Silicone additive and
(E) First particle Some part of isocyanate-terminated prepolymers used were prepared in the same way as in Example 1 by adjusting the isocyanate group content to 4.3% by mass through the preliminary reaction between polyol and polymeric MDI (trade name: Millionate MR200, manufactured by Tosoh Corporation).

<Preparation of Members 2 to 37 for Electrophotography>

Members 2 to 37 for electrophotography were produced and evaluated in the same way as in Example 1 except that the coating liquid for use in the formation of a surface layer was changed as described in Tables 9-1 to 9-6.

As for Examples 35, 36 and 37, the members for electrophotography were produced in the same way as in Examples 1, 18 and 31, respectively, followed by the ultraviolet treatment of their surface layers. The ultraviolet treatment was carried out by irradiation with ultraviolet rays with a wavelength of 254 nm at a cumulative light quantity of 9000 mJ/cm$^2$ using a low-pressure mercury lamp (manufactured by Toshiba Lighting & Technology Corp. (formerly HARISON TOSHIBA LIGHTING Corp.)). The evaluation results are shown in Tables 9-1 to 9-6.

TABLE 3-1

|  | Coating liquid 1 | Coating liquid 2 | Coating liquid 3 | Coating liquid 4 | Coating liquid 5 | Coating liquid 6 | Coating liquid 7 | Coating liquid 8 | Coating liquid 9 | Coating liquid 10 |
|---|---|---|---|---|---|---|---|---|---|---|
| Polyol (A) | A-1 | A-1 | A-1 | A-1 | A-1 | A-1 | A-1 | A-1 | A-1 | A-1 |
| Isocyanate (B) | B-1 | B-1 | B-1 | B-1 | B-1 | B-1 | B-1 | B-1 | B-1 | B-1 |
| Amount of A/B added (parts) | 41.5/54.9 | 41.5/54.9 | 41.5/54.9 | 41.5/54.9 | 41.5/54.9 | 41.5/54.9 | 41.5/54.9 | 41.5/54.9 | 41.5/54.9 | 41.5/54.9 |
| Second particle (C) | C-1 | C-1 | C-1 | — | — | — | — | C-1 | C-1 | C-2 |
| Amount of C added (parts) | 30 | 15 | 45 | — | — | — | — | 30 | 30 | 30 |
| Silicone additive (D) | — | — | — | — | — | — | — | — | — | — |
| Amount of D added (parts) | — | — | — | — | — | — | — | — | — | — |

TABLE 3-1-continued

|  | Coating liquid 1 | Coating liquid 2 | Coating liquid 3 | Coating liquid 4 | Coating liquid 5 | Coating liquid 6 | Coating liquid 7 | Coating liquid 8 | Coating liquid 9 | Coating liquid 10 |
|---|---|---|---|---|---|---|---|---|---|---|
| First particle (E) | E-1 | E-1 | E-1 | E-1 | E-1 | E-1 | E-1 | E-2 | E-3 | E-1 |
| Amount of E added (parts) | 15 | 15 | 15 | 15 | 30 | 45 | 60 | 15 | 15 | 15 |

TABLE 3-2

|  | Coating liquid 11 | Coating liquid 12 | Coating liquid 13 | Coating liquid 14 | Coating liquid 15 | Coating liquid 16 | Coating liquid 17 | Coating liquid 18 | Coating liquid 19 | Coating liquid 20 |
|---|---|---|---|---|---|---|---|---|---|---|
| Polyol (A) | A-1 | A-1 | A-1 | A-1 | A-2 | A-2 | A-2 | A-2 | A-2 | A-2 |
| Isocyanate (B) | B-1 | B-1 | B-1 | B-1 | B-2 | B-2 | B-2 | B-2 | B-2 | B-2 |
| Amount of A/B added (parts) | 41.5/54.9 | 41.5/54.9 | 41.5/54.9 | 41.5/54.9 | 46/54 | 46/54 | 46/54 | 46/54 | 46/54 | 46/54 |
| Second particle (C) | C-3 | C-4 | C-1 | C-1 | C-1 | C-1 | C-1 | — | — | — |
| Amount of C added (parts) | 30 | 30 | 30 | 30 | 15 | 30 | 45 | — | — | — |
| Silicone additive (D) | — | — | D-1 | D-2 | — | — | — | — | — | — |
| Amount of D added (parts) | — | — | 0.1 | 0.1 | — | — | — | — | — | — |
| First particle (E) | E-1 | E-1 | E-1 | E-1 | E-1 | E-1 | E-1 | E-1 | E-1 | E-1 |
| Amount of E added (parts) | 15 | 15 | 15 | 15 | 15 | 15 | 15 | 15 | 30 | 45 |

TABLE 3-3

|  | Coating liquid 21 | Coating liquid 22 | Coating liquid 23 | Coating liquid 24 | Coating liquid 25 | Coating liquid 26 | Coating liquid 27 | Coating liquid 28 | Coating liquid 29 | Coating liquid 30 |
|---|---|---|---|---|---|---|---|---|---|---|
| Polyol (A) | A-2 | A-2 | A-2 | A-2 | A-2 | A-3 | A-3 | A-3 | A-4 | A-4 |
| Isocyanate (B) | B-2 | B-2 | B-2 | B-2 | B-2 | B-3 | B-3 | B-3 | B-4 | B-4 |
| Amount of NB added (parts) | 46/54 | 46/54 | 46/54 | 46/54 | 46/54 | 52/48 | 52/48 | 52/48 | 43/57 | 43/57 |
| Second particle (C) | — | C-1 | C-1 | C-4 | C-1 | C-1 | — | C-4 | C-1 | — |
| Amount of C added (parts) | — | 30 | 30 | 30 | 30 | 30 | — | 30 | 30 | — |
| Silicone additive (D) | — | — | — | — | D-1 | — | — | — | — | — |
| Amount of D added (parts) | — | — | — | — | 0.1 | — | — | — | — | — |
| First particle (E) | E-1 | E-2 | E-3 | E-1 | E-1 | E-1 | E-1 | E-1 | E-1 | E-1 |
| Amount of E added (parts) | 60 | 15 | 15 | 15 | 15 | 15 | 15 | 15 | 15 | 15 |

TABLE 3-4

|  | Coating liquid 31 | Coating liquid 32 | Coating liquid 33 |
|---|---|---|---|
| Polyol (A) | A-4 | A-5 | A-6 |
| Isocyanate (B) | B-4 | B-5 | B-6 |
| Amount of A/B added (parts) | 43/57 | 59/41 | 41/59 |
| Second particle (C) | C-4 | C-1 | C-1 |
| Amount of C added (parts) | 30 | 30 | 30 |
| Silicone additive (D) | — | — | — |
| Amount of D added (parts) | — | — | — |
| First particle (E) | E-1 | E-1 | E-1 |
| Amount of E added (parts) | 15 | 15 | 15 |

TABLE 4

| A-1 | Polyester polyol (trade name: P2010, manufactured by Kuraray Co., Ltd.) |
|---|---|
| A-2 | Polycarbonate polyol (trade name: T5652, manufactured by Asahi Kasei Chemicals Corporation) |
| A-3 | Castor oil (trade name: URIC-H 1823, manufactured by Itoh Oil Chemicals Co., Ltd.) |
| A-4 | Polyolefin polyol (trade name: G2000, manufactured by Nippon Soda Co., Ltd.) |
| A-5 | Acrylic polyol (trade name: DC2016, manufactured by Daicel Corporation (formerly Daicel Chemical Industries, Ltd.) |
| A-6 | Polyether polyol (trade name: Exenol 3020, manufactured by Asahi Glass Co., Ltd.) |
| B-1 | Polyester polyol/polymeric MDI (trade name: P3010, manufactured by Kuraray Co., Ltd./trade name: Millionate MR200, manufactured by Tosoh Corporation) |

TABLE 4-continued

| | |
|---|---|
| B-2 | Polycarbonate polyol/polymeric MDI (trade name: T5652, manufactured by Asahi Kasei Chemicals Corporation/trade name: Millionate MR200, manufactured by Tosoh Corporation) |
| B-3 | Polyester polyol/polymeric MDI (trade name: P2050, manufactured by Kuraray Co., Ltd./trade name: Millionate MR200, manufactured by Tosoh Corporation) |
| B-4 | Polyolefin polyol/polymeric MDI (trade name: G2000, manufactured by Nippon Soda Co., Ltd./trade name: Millionate MR200, manufactured by Tosoh Corporation) |
| B-5 | Isocyanate A/isocyanate B = 4/3 (trade name: Vestanat B1370, manufactured by Evonik Industries AG (formerly Degussa AG)/trade name: Duranate TPA-B80E, manufactured byAsahi Kasei Chemicals Corporation) |
| B-6 | Polypropylene glycol polyol/polymeric MDI (trade name: Exenol 1030, manufactured by Asahi Glass Co., Ltd./ trade name: Millionate MR200, manufactured by Tosoh Corporation) |
| C-1 | DAIMICBEAZ UCN-5070D (trade name, number-average particle diameter: 7.0 μm, manufactured by Dainichi Seika Color & Chemical Mfg. Co., Ltd.) |
| C-2 | DAIMICBEAZ UCN-5150D (trade name, number-average particle diameter: 7.0 μm, manufactured by Dainichi Seika Color & Chemical Mfg. Co., Ltd.) |
| C-3 | Art Pearl JB-600T (trade name, number-average particle diameter: 10.0 μm, manufactured by Negami Chemical Industrial Co., Ltd.) |
| C-4 | Techpolymer MBX-8 (trade name, number-average particle diameter: 8.0 μm, manufactured by Sekisui Plastics Co., Ltd.) |
| D-1 | Modified dimethylsilicone oil (trade name: SH-28PA, manufactured by Dow Corning Toray Co., Ltd. (formerly Dow Corning Toray Silicone Co., Ltd.)) |
| D-2 | Silicone-modified acrylic resin (trade name: SQ-100, manufactured by Tokushiki Co., Ltd. |
| E-1 | Metablen C-223A (trade name, number-average particle diameter: 200 nm, butadiene rubber type, manufactured by Mitsubishi Rayon Co., Ltd.) |
| E-2 | Metablen S-2001 (trade name, number-average particle diameter: 800 nm, silicone rubber type, manufactured by Mitsubishi Rayon Co., Ltd.) |
| E-3 | Metablen W-450A (trade name, number-average particle diameter: 400 nm, acrylic rubber type, manufactured by Mitsubishi Rayon Co., Ltd.) |

Example 38

Member 38 for electrophotography was produced and evaluated in the same way as in Example 1 except that a material described in Table 5 was used instead of Epichlomer CG-102 (also referred to as CG102) in the preparation of kneaded rubber composition A. The evaluation results are shown in Table 9-6.

TABLE 5

| Material | Parts by mass |
|---|---|
| Epichlorohydrin-ethylene oxide-allyl glycidyl ether ternary copolymer (GECO) (trade name: EPION 301, manufactured by Osaka Soda Co., Ltd. (formally Daiso Co., Ltd.)) | 100.0 |

Example 39

Each material of type and amount shown in Table 6 was mixed using a pressurization-type kneader to obtain kneaded rubber composition A. Further, the kneaded rubber composition A was mixed with each material of type and amount shown in Table 7 using an open roll to obtain an unvulcanized rubber composition. Member 39 for electrophotography was produced and evaluated in the same way as in Example 1 except that the unvulcanized rubber composition was used. The evaluation results are shown in Table 9-6.

TABLE 6

| Material | Parts by mass |
|---|---|
| NBR (trade name: Nipol DN219, manufactured by Zeon Corporation) | 100 |
| Carbon black (trade name: Toka Black #7360SB, manufactured by Tokai Carbon Co., Ltd.) | 40 |
| Calcium carboate (trade name: Nanox #30, manufactured by Maruo Calcium Co., Ltd.) | 20 |
| Zinc oxide | 5 |
| Stearic acid | 1 |

TABLE 7

| Material | Parts by mass |
|---|---|
| Sulfur | 1.2 |
| Tetrabenzylthiuram disulfide (trade name: TBZTD, manufactured by Sanshin Chemical Industry Co., Ltd.) | 4.5 |

Example 40

The same substrate as that used in Example 1 was coated with a primer (trade name: DY35-051, manufactured by Dow Corning Toray Co., Ltd.) and baked at a temperature of 150° C. for 30 minutes. The obtained product was used as a substrate. This substrate was placed in a die, and an addition-type silicone rubber composition having a mixture of materials described in Table 8 was injected to a cavity formed in the die.

TABLE 8

| Material | Parts by mass |
|---|---|
| Liquid silicone rubber (trade name: SE6724A/B, manufactured by Dow Corning Toray Co., Ltd.) | 100 |
| Carbo black (trade name: Toka Black #7360SB, manufactured by Tokai Carbon Co., Ltd.) | 28 |
| Silica powder | 0.2 |
| Platinum catalyst | 0.1 |

Next, the die was heated at 120° C. for 8 minutes and then cooled to room temperature, followed by demolding. Then, the obtained product was heated at 200° C. for 60 minutes, vulcanized and cured to obtain an elastic layer having a thickness of 2.5 mm on the outer peripheral surface of the substrate. Member 40 for electrophotography was produced and evaluated by the same subsequent procedures as in Example 1. The evaluation results are shown in Table 9-6.

TABLE 9-1

|  | Example 1 | Example 2 | Example 3 | Example 4 | Example 5 | Example 6 | Example 7 | Example 8 |
|---|---|---|---|---|---|---|---|---|
| No. of member for electrophotography | 1 | 2 | 3 | 4 | 5 | 6 | 7 | 8 |
| Rubber material of elastic layer | CG102 | CG102 | CG102 | CG102 | CG102 | CG102 | CG102 | CG102 |
| Surface layer material | Coating liquid 1 | Coating liquid 2 | Coating liquid 3 | Coating liquid 4 | Coating liquid 5 | Coating liquid 6 | Coating liquid 7 | Coating liquid 1 |
| Surface layer thickness (μm) | 20 | 20 | 20 | 20 | 20 | 20 | 20 | 10 |
| Ultraviolet treatment | — | — | — | — | — | — | — | — |
| Physical property evaluation |  |  |  |  |  |  |  |  |
| Ra (μm) | 1.75 | 1.51 | 1.93 | 1.11 | 1.18 | 1.23 | 1.25 | 1.86 |
| Universal hardness of surface of surface layer (N/mm$^2$) | 3.3 | 3.2 | 3.2 | 2.8 | 3.1 | 2.9 | 5.8 | 2.6 |
| Martens hardness of second convex of surface layer (N/mm$^2$) | 3.4 | 3.4 | 3.3 | — | — | — | — | 3.1 |
| Volume resistivity of surface layer (Ω·cm) | $6.00 \times 10^{10}$ | $4.90 \times 10^{10}$ | $7.80 \times 10^{10}$ | $3.80 \times 10^{10}$ | $4.80 \times 10^{10}$ | $5.30 \times 10^{10}$ | $7.20 \times 10^{10}$ | $5.90 \times 10^{10}$ |
| Average inter-particle surface distance of first particles resulting in a first convex (nm) | 38 | 40 | 41 | 44 | 38 | 29 | 21 | 37 |
| Image evaluation |  |  |  |  |  |  |  |  |
| Dirt evaluation | A | A | B | A | A | A | A | A |
| Evaluation of amount of injection charge (−V) | 5 | 7 | 4 | 9 | 8 | 8 | 6 | 9 |
| Discharge property evaluation | A | A | A | B | A | A | A | A |
| Dirt evaluation (cleaner-less) 5% | 11.3 | 10.4 | 15.2 | 8.3 | 8.5 | 8.6 | 8.5 | 11.5 |
| 10% | 5.9 | 5.4 | 7.8 | 5.1 | 4.8 | 4.8 | 4.7 | 6 |
| Evaluation of amount of injection charge (cleaner-less) (−V) 5% | 20 | 19 | 19 | 24 | 24 | 22 | 23 | 24 |
| 10% | 39 | 42 | 36 | 50 | 49 | 48 | 48 | 47 |

TABLE 9-2

|  | Example 9 | Example 10 | Example 11 | Example 12 | Example 13 | Example 14 | Example 15 | Example 16 |
|---|---|---|---|---|---|---|---|---|
| No. of member for electrophotography | 9 | 10 | 11 | 12 | 13 | 14 | 15 | 16 |
| Rubber material of elastic layer | CG102 | CG102 | CG102 | CG102 | CG102 | CG102 | CG102 | CG102 |
| Surface layer material | Coating liquid 1 | Coating liquid 8 | Coating liquid 9 | Coating liquid 10 | Coating liquid 11 | Coating liquid 12 | Coating liquid 13 | Coating liquid 14 |
| Surface layer thickness (μm) | 40 | 20 | 20 | 20 | 20 | 20 | 20 | 20 |
| Ultraviolet treatment | — | — | — | — | — | — | — | — |
| Physical property evaluation |  |  |  |  |  |  |  |  |
| Ra (μm) | 1.62 | 1.75 | 1.73 | 2.53 | 1.87 | 2.01 | 1.78 | 1.80 |
| Universal hardness of surface of surface layer (N/mm$^2$) | 4.3 | 3.1 | 3.4 | 3.1 | 2.9 | 5.8 | 3.4 | 3.5 |
| Martens hardness of second convex of surface layer (N/mm$^2$) | 4.4 | 3.3 | 3.5 | 3.5 | 2.9 | 12.3 | 3.5 | 3.6 |
| Volume resistivity of surface layer (Ω·cm) | $6.30 \times 10^{10}$ | $7.30 \times 10^{10}$ | $7.10 \times 10^{10}$ | $6.60 \times 10^{10}$ | $6.50 \times 10^{10}$ | $7.20 \times 10^{10}$ | $7.70 \times 10^{10}$ | $7.60 \times 10^{10}$ |
| Average inter-particle surface distance of first particles resulting in a first convex (nm) | 41 | 38 | 39 | 41 | 39 | 40 | 37 | 38 |
| Image evaluation |  |  |  |  |  |  |  |  |
| Dirt evaluation | A | A | A | B | A | B | A | A |
| Evaluation of amount of injection charge (−V) | 3 | 5 | 5 | 6 | 5 | 3 | 5 | 4 |
| Discharge property evaluation | A | A | A | A | A | A | A | A |
| Dirt evaluation (cleaner-less) 5% | 12 | 12 | 11.1 | 14.4 | 11.8 | 23 | 12.1 | 12.2 |
| 10% | 6.1 | 6.4 | 6.3 | 8.1 | 7.6 | 14.3 | 6.2 | 6.1 |
| Evaluation of amount of injection charge (cleaner-less) (−V) 5% | 15 | 20 | 19 | 21 | 21 | 13 | 21 | 20 |
| 10% | 38 | 39 | 41 | 43 | 44 | 39 | 44 | 45 |

TABLE 9-3

|  | Example 17 | Example 18 | Example 19 | Example 20 | Example 21 | Example 22 | Example 23 | Example 24 |
|---|---|---|---|---|---|---|---|---|
| Member for electrophotography | 17 | 18 | 19 | 20 | 21 | 22 | 23 | 24 |
| Rubber material of elastic layer | CG102 | CG102 | CG102 | CG102 | CG102 | CG102 | CG102 | CG102 |
| Surface layer material | Coating liquid 15 | Coating liquid 16 | Coating liquid 17 | Coating liquid 18 | Coating liquid 19 | Coating liquid 20 | Coating liquid 21 | Coating liquid 22 |
| Surface layer thickness (μm) | 20 | 20 | 20 | 20 | 20 | 20 | 20 | 20 |
| Ultraviolet treatment | — | — | — | — | — | — | — | — |
| Physical property evaluation |  |  |  |  |  |  |  |  |
| Ra (μm) | 1.59 | 1.80 | 2.01 | 1.12 | 1.20 | 1.25 | 1.27 | 1.79 |
| Universal hardness of surface of surface layer (N/mm$^2$) | 3.3 | 3.4 | 3.5 | 3.1 | 3.2 | 3.1 | 3.4 | 3.4 |

TABLE 9-3-continued

|  | | Example 17 | Example 18 | Example 19 | Example 20 | Example 21 | Example 22 | Example 23 | Example 24 |
|---|---|---|---|---|---|---|---|---|---|
| Martens hardness of second convex of surface layer (N/mm$^2$) | | 3.5 | 3.5 | 3.5 | — | — | — | — | 3.5 |
| Volume resistivity of surface layer (Ω · cm) | | $2.50 \times 10^{12}$ | $3.70 \times 10^{12}$ | $5.20 \times 10^{12}$ | $1.20 \times 10^{12}$ | $1.90 \times 10^{12}$ | $2.70 \times 10^{12}$ | $4.30 \times 10^{12}$ | $3.50 \times 10^{12}$ |
| Average inter-particle surface distance of first particles resulting in a first convex (nm) | | 39 | 38 | 37 | 36 | 35 | 29 | 24 | 39 |
| Image evaluation | | | | | | | | | |
| Dirt evaluation | | A | A | B | A | A | A | A | A |
| Evaluation of amount of injection charge (−V) | | 6 | 5 | 4 | 8 | 7 | 5 | 4 | 6 |
| Discharge property evaluation | | A | A | A | B | A | A | A | A |
| Dirt evaluation (cleaner-less) | 5% | 8.8 | 9.2 | 10.5 | 8.3 | 8.5 | 8.8 | 8.7 | 10.6 |
| | 10% | 4.9 | 4.8 | 5.3 | 4.9 | 4.7 | 4.8 | 4.6 | 5.2 |
| Evaluation of amount of injection charge (cleaner-less) (−V) | 5% | 18 | 17 | 14 | 19 | 20 | 19 | 19 | 14 |
| | 10% | 39 | 34 | 30 | 41 | 42 | 41 | 40 | 36 |

TABLE 9-4

|  | | Example 25 | Example 26 | Example 27 | Example 28 | Example 29 | Example 30 |
|---|---|---|---|---|---|---|---|
| No. of member for electrophotography | | 25 | 26 | 27 | 28 | 29 | 30 |
| Rubber material of elastic layer | | CG102 | CG102 | CG102 | CG102 | CG102 | CG102 |
| Surface layer material | | Coating liquid 23 | Coating liquid 24 | Coating liquid 25 | Coating liquid 26 | Coating liquid 27 | Coating liquid 28 |
| Surface layer thickness (μm) | | 20 | 20 | 20 | 20 | 20 | 20 |
| Ultraviolet treatment | | — | — | — | — | — | — |
| Physical property evaluation | | | | | | | |
| Ra (μm) | | 1.80 | 2.10 | 1.81 | 1.81 | 1.27 | 2.33 |
| Universal hardness of surface of surface layer (N/mm$^2$) | | 3.5 | 6.1 | 3.4 | 4.8 | 4.7 | 6.8 |
| Martens hardness of second convex of surface layer (N/mm$^2$) | | 3.6 | 12.6 | 3.5 | 4.9 | — | 15.1 |
| Volume resistivity of surface layer (Ω · cm) | | $4.30 \times 10^{12}$ | $4.70 \times 10^{12}$ | $5.20 \times 10^{12}$ | $9.20 \times 10^{13}$ | $6.80 \times 10^{13}$ | $9.70 \times 10^{13}$ |
| Average inter-particle surface distance of first particles resulting in a first convex (nm) | | 40 | 39 | 36 | 37 | 38 | 40 |
| Image evaluation | | | | | | | |
| Dirt evaluation | | A | B | A | A | A | B |
| Evaluation of amount of injection charge (−V) | | 5 | 3 | 5 | 4 | 8 | 3 |
| Discharge property evaluation | | A | A | A | A | B | A |
| Dirt evaluation (cleaner-less) | 5% | 9.9 | 22.6 | 10.1 | 14.7 | 8.2 | 26.5 |
| | 10% | 5.2 | 13.8 | 4.8 | 8.2 | 5.2 | 19.1 |
| Evaluation of amount of injection charge (cleaner-less) (−V) | 5% | 16 | 12 | 15 | 18 | 18 | 14 |
| | 10% | 37 | 30 | 36 | 40 | 41 | 35 |

TABLE 9-5

|  | | Example 31 | Example 32 | Example 33 | Example 34 | Example 35 |
|---|---|---|---|---|---|---|
| No. of member for electrophotography | | 31 | 32 | 33 | 34 | 35 |
| Rubber material of elastic layer | | CG102 | CG102 | CG102 | CG102 | CG102 |
| Surface layer material | | Coating liquid 29 | Coating liquid 30 | Coating liquid 31 | Coating liquid 33 | Coating liquid 1 |
| Surface layer thickness (μm) | | 20 | 20 | 20 | 20 | 20 |
| Ultraviolet treatment | | — | — | — | — | Present |
| Physical property evaluation | | | | | | |
| Ra (μm) | | 1.79 | 1.22 | 2.30 | 1.77 | 1.74 |
| Universal hardness of surface of surface layer (N/mm$^2$) | | 3.1 | 4.0 | 6.3 | 2.4 | 3.4 |
| Martens hardness of second convex of surface layer (N/mm$^2$) | | 3.3 | 4.2 | 14.1 | 2.9 | 3.5 |
| Volume resistivity of surface layer (Ω · cm) | | $3.40 \times 10^{14}$ | $1.50 \times 10^{14}$ | $3.30 \times 10^{14}$ | $8.70 \times 10^{8}$ | $5.80 \times 10^{10}$ |
| Average inter-particle surface distance of first particles resulting in a first convex (nm) | | 36 | 39 | 37 | 37 | 39 |
| Image evaluation | | | | | | |
| Dirt evaluation | | A | A | B | B | A |
| Evaluation of amount of injection charge (−V) | | 3 | 5 | 1 | 15 | 8 |
| Discharge property evaluation | | A | B | A | A | A |
| Dirt evaluation (cleaner-less) | 5% | 8.8 | 8.7 | 24.5 | 29.5 | 6.9 |
| | 10% | 5.4 | 5.1 | 18.7 | 16.8 | 4.1 |

TABLE 9-5-continued

|  | | Example 31 | Example 32 | Example 33 | Example 34 | Example 35 |
|---|---|---|---|---|---|---|
| Evaluation of amount of injection | 5% | 11 | 9 | 9 | 48 | 18 |
| charge (cleaner-less) (−V) | 10% | 33 | 26 | 30 | 121 | 41 |

TABLE 9-6

|  | | Example 36 | Example 37 | Example 38 | Example 39 | Example 40 |
|---|---|---|---|---|---|---|
| No. of member for electrophotography | | 36 | 37 | 38 | 39 | 40 |
| Rubber material of elastic layer | | CG102 | CG102 | Epion301 | NBR | Silicone |
| Surface layer material | | Coating liquid 16 | Coating liquid 29 | Coating liquid 1 | Coating liquid 1 | Coating liquid 1 |
| Surface layer thickness (μm) | | 20 | 20 | 20 | 20 | 20 |
| Ultraviolet treatment | | Present | Present | — | — | — |
| Physical property evaluation | | | | | | |
| Ra (μm) | | 1.79 | 1.81 | 1.74 | 1.82 | 1.69 |
| Universal hardness of surface of surface layer (N/mm$^2$) | | 3.5 | 3.1 | 3.1 | 6.3 | 2.1 |
| Martens hardness of second convex of surface layer (N/mm$^2$) | | 3.6 | 3.2 | 3.3 | 6.5 | 2.6 |
| Volume resistivity of surface layer (Ω · cm) | | $3.50 \times 10^{12}$ | $3.10 \times 10^{14}$ | $4.90 \times 10^{10}$ | $5.10 \times 10^{10}$ | $5.30 \times 10^{10}$ |
| Average inter-particle surface distance of first particles resulting in a first convex (nm) | | 36 | 36 | 36 | 40 | 39 |
| Image evaluation | | | | | | |
| Dirt evaluation | | A | A | A | B | B |
| Evaluation of amount of injection charge (−V) | | 6 | 4 | 12 | 2 | 4 |
| Discharge property evaluation | | A | A | A | B | B |
| Dirt evaluation (cleaner-less) | 5% | 7.1 | 7.1 | 12.5 | 28.3 | 14.7 |
|  | 10% | 3.9 | 4.3 | 6.8 | 20.2 | 9.9 |
| Evaluation of amount of injection | 5% | 12 | 9 | 22 | 12 | 13 |
| charge (cleaner-less) (−V) | 10% | 38 | 24 | 48 | 38 | 35 |

Comparative Example 1

Member 41 for electrophotography was produced and evaluated in the same way as in Example 1 except that the rubber particle as the first particle were not added in the preparation of coating liquid 1. The evaluation results are shown in Table 10.

Comparative Example 2

Member 42 for electrophotography was produced and evaluated in the same way as in Example 1 except that coating liquid 32 was used as the coating liquid. The evaluation results are shown in Table 10.

Comparative Example 3

Member 43 for electrophotography was produced and evaluated in the same way as in Example 1 except that 15 parts by mass of titanium oxide (trade name: JR301, manufactured by TAYCA Corp.) having a number-average particle diameter of 300 nm were added as the first particle instead of the rubber particle in the preparation of coating liquid 1. The evaluation results are shown in Table 10. Fine asperities derived from filling with titanium oxide were not formed on the surface of the member 43 for electrophotography.

Comparative Example 4

Member 44 for electrophotography was produced and evaluated in the same way as in Example 1 except that 60 parts by mass of titanium oxide (trade name: JR301, manufactured by TAYCA Corp.) having a number-average particle diameter of 300 nm were added as the first particle instead of the rubber particle in the preparation of coating liquid 1. The evaluation results are shown in Table 10.

TABLE 10

|  | Comparative Example 1 | Comparative Example 2 | Comparative Example 3 | Comparative Example 4 |
|---|---|---|---|---|
| No. of member for electrophotography | 41 | 42 | 43 | 44 |
| Rubber material of elastic layer | CG102 | CG102 | CG102 | CG102 |
| Surface layer material | Coating liquid 1 | Coating liquid 32 | Coating liquid 1 | Coating liquid 1 |
| Surface layer thickness (μm) | 20 | 20 | 20 | 20 |
| Ultraviolet treatment | — | — | — | — |
| Physical property evaluation | | | | |
| Ra (μm) | 1.75 | 1.92 | 1.82 | 1.91 |
| Universal hardness of surface of surface layer (N/mm$^2$) | 3.3 | 18.6 | 10.4 | 12.4 |
| Martens hardness of second convex of surface layer (N/mm$^2$) | 3.4 | 16.1 | 8.2 | 10.9 |
| Volume resistivity of surface layer (Ω·cm) | $6.00 \times 10^{10}$ | $4.70 \times 10^{12}$ | $6.50 \times 10^{10}$ | $8.90 \times 10^{10}$ |

TABLE 10-continued

|  |  | Comparative Example 1 | Comparative Example 2 | Comparative Example 3 | Comparative Example 4 |
|---|---|---|---|---|---|
| Average inter-particle surface distance of first particles resulting in a first convex (nm) | | — | 44 | 7699 | 576 |
| Image evaluation | | | | | |
| Dirt evaluation | | D | C | C | C |
| Evaluation of amount of injection charge (−V) | | 5 | 2 | 8 | 7 |
| Discharge property evaluation | | A | A | A | A |
| Dirt evaluation (cleaner-less) | 5% | 42.3 | 62.5 | 52.6 | 61.5 |
| | 10% | 28.5 | 55.3 | 46.5 | 56.7 |
| Evaluation of amount of | 5% | 24 | 18 | 33 | 19 |
| injection charge (cleaner-less) (−V) | 10% | 48 | 38 | 69 | 44 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-241883, filed Nov. 28, 2014, which is hereby incorporated by reference herein in its entirety.

What is claimed is:

1. A member for electrophotography comprising:
a substrate,
an elastic layer on the substrate, and
a surface layer on the elastic layer, wherein,
the surface layer comprises a binder resin and first particles,
the surface of the surface layer has first convexes derived from the first particles,
the first particles resulting in the first convex have an average inter-particle surface distance of 50 nm or less,
the first particles have a number-average particle diameter of 200 nm or more and 1000 nm or less, and
the surface of the surface layer has a universal hardness of 1.0 N/mm$^2$ or more and 7.0 N/mm$^2$ or less.

2. The member for electrophotography according to claim 1, wherein the first particles are rubber particles.

3. The member for electrophotography according to claim 1, wherein the surface layer has a volume resistivity of 1.0×10$^{10}$ Ω·cm or more and 1.0×10$^{16}$ Ω·cm or less.

4. The member for electrophotography according to claim 1, wherein
the surface layer further comprises a second particle,
the surface of the surface layer has a second convex derived from the second particle, and
the second particle has a number-average particle diameter of 3 μm or more and 30 μm or less.

5. The member for electrophotography according to claim 4, wherein the second convex of the surface layer has a Martens hardness of 1.0 N/mm$^2$ or more and 10.0 N/mm$^2$ or less.

6. The member for electrophotography according to claim 4, wherein the second particle is a urethane resin particle.

7. A process cartridge which is configured to be detachably attachable to the body of an image forming apparatus, the process cartridge comprising an image bearing member and a charging member disposed in contact with the image bearing member, wherein
the charging member comprises a substrate, an elastic layer on the substrate, and a surface layer on the elastic layer,
the surface layer comprises a binder resin and first particles,
the surface of the surface layer has first convexes derived from the first particles,
the first particles resulting in the first convex have an average inter-particle surface distance of 50 nm or less,
the first particles have a number-average particle diameter of 200 nm or more and 1000 nm or less, and
the surface of the surface layer has a universal hardness of 1.0 N/mm$^2$ or more and 7.0 N/mm$^2$ or less.

8. An image forming apparatus comprising an image bearing member, a charging apparatus which charges the image bearing member, a developing apparatus which develops an electrostatic latent image formed on the image bearing member by use of a developer, and a transfer member which transfers the developer supported by the image bearing member to a transfer medium, wherein
the charging apparatus comprises a charging member,
the charging member comprises a substrate, an elastic layer on the substrate, and a surface layer on the elastic layer,
the surface layer comprises a binder resin and first particles,
the surface of the surface layer has first convexes derived from the first particles,
the first particles resulting in the first convex have an average inter-particle surface distance of 50 nm or less,
the first particles have a number-average particle diameter of 200 nm or more and 1000 nm or less, and
the surface of the surface layer has a universal hardness of 1.0 N/mm$^2$ or more and 7.0 N/mm$^2$ or less.

9. The image forming apparatus according to claim 8, wherein the charging member is moved with a difference in speed from the image bearing member.

* * * * *